United States Patent
Ishimoto

(10) Patent No.: US 9,038,052 B2
(45) Date of Patent: May 19, 2015

(54) TERMINAL DEVICE FOR PROVIDING FIRMWARE PACKAGE BY BEING CONNECTABLE WITH PLURALITY OF ACCESSORY DEVICES AND A SERVER

(75) Inventor: Kan Ishimoto, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 93 days.

(21) Appl. No.: 13/248,204

(22) Filed: Sep. 29, 2011

(65) Prior Publication Data

US 2012/0084767 A1 Apr. 5, 2012

(30) Foreign Application Priority Data

Sep. 30, 2010 (JP) ................................. 2010-221251

(51) Int. Cl.
*G06F 9/44* (2006.01)
*G06F 9/445* (2006.01)

(52) U.S. Cl.
CPC ........................ *G06F 8/65* (2013.01)

(58) Field of Classification Search
USPC .......................................... 717/171, 172, 173
See application file for complete search history.

(56) References Cited

U.S. PATENT DOCUMENTS

| | | | |
|---|---|---|---|
| 5,764,992 A * | 6/1998 | Kullick et al. | 717/170 |
| 6,438,643 B1 | 8/2002 | Ohara et al. | |
| 7,055,148 B2 * | 5/2006 | Marsh et al. | 717/172 |
| 2002/0100036 A1 * | 7/2002 | Moshir et al. | 717/173 |
| 2002/0141419 A1 | 10/2002 | Tomita et al. | |
| 2002/0194313 A1 * | 12/2002 | Brannock | 709/220 |
| 2003/0051066 A1 * | 3/2003 | Pace et al. | 709/316 |
| 2004/0049565 A1 * | 3/2004 | Keller et al. | 709/223 |
| 2005/0120384 A1 * | 6/2005 | Stone et al. | 725/132 |
| 2005/0144616 A1 * | 6/2005 | Hammond et al. | 717/173 |
| 2006/0236325 A1 * | 10/2006 | Rao et al. | 719/315 |
| 2006/0258344 A1 * | 11/2006 | Chen | 455/419 |

(Continued)

FOREIGN PATENT DOCUMENTS

| | | |
|---|---|---|
| JP | 11-203122 A | 7/1999 |
| JP | 2001-216115 | 8/2001 |

(Continued)

OTHER PUBLICATIONS

Extended European Search Report dated Dec. 1, 2011 from related application EP 11182978.4-2211.

(Continued)

*Primary Examiner* — Lewis A Bullock, Jr.
*Assistant Examiner* — Mark Gooray
(74) *Attorney, Agent, or Firm* — Scully,Scott, Murphy & Presser, P.C.

(57) ABSTRACT

A terminal device configured to be connectable with a plurality of accessory devices and a server configured to store a firmware package, may include a processor, and a memory storing computer readable instructions that, when executed, cause the terminal device to perform functions. The functions may include a function of receiving the firmware package from the server, a function of storing the firmware package received from the server into the memory, a function of providing the stored firmware package to a first one of the plurality of accessory devices to install the firmware package therein, and a function of providing the stored firmware package to the other of the plurality of accessory devices to which the same firmware package is applied as the first one, to install the firmware package therein.

20 Claims, 5 Drawing Sheets

(56) References Cited

U.S. PATENT DOCUMENTS

| | | | |
|---|---|---|---|
| 2007/0294385 A1* | 12/2007 | Kapadekar et al. | 709/223 |
| 2008/0189693 A1* | 8/2008 | Pathak | 717/168 |
| 2008/0310425 A1* | 12/2008 | Nath et al. | 370/395.54 |
| 2009/0235246 A1* | 9/2009 | Seal et al. | 717/173 |
| 2009/0328189 A1* | 12/2009 | Budyta et al. | 726/14 |
| 2010/0262957 A1* | 10/2010 | Uppunda | 717/170 |

FOREIGN PATENT DOCUMENTS

| | | |
|---|---|---|
| JP | 2001-306281 A | 11/2001 |
| JP | 2002-287977 | 10/2002 |
| JP | 2002-288064 | 10/2002 |
| JP | 2004-234056 A | 8/2004 |
| JP | 2005-267106 A | 9/2005 |
| JP | 2006-171920 | 6/2006 |
| JP | 2006-178892 | 7/2006 |
| JP | 2008-234565 | 10/2008 |
| JP | 2008-279714 | 11/2008 |
| JP | 2010-92322 | 4/2010 |

OTHER PUBLICATIONS

Japanese Official Action dated Nov. 19, 2013 received in related application JP 2010-221251.

Chinese Official Action dated Jan. 13, 2014 received from the Chinese Patent Office in related application CN 201110291083.0.

Chinese Official Action dated Jul. 11, 2014 received from the Chinese Patent Office in related application CN 201110291083.0.

Chinese Official Action dated Oct. 10, 2014 received from the Chinese Patent Office in related application CN 201110291083.0 together with an English language translation.

\* cited by examiner

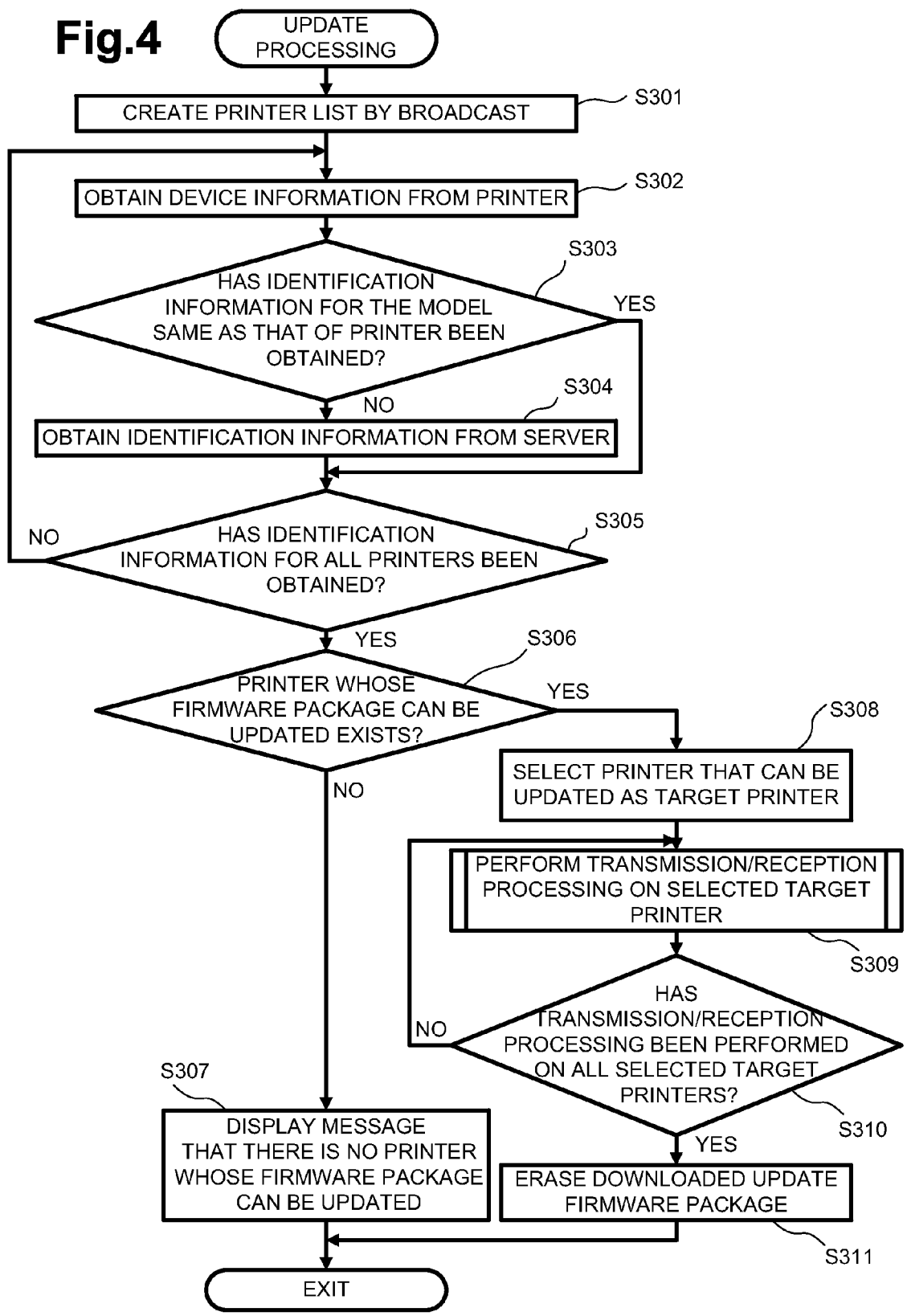

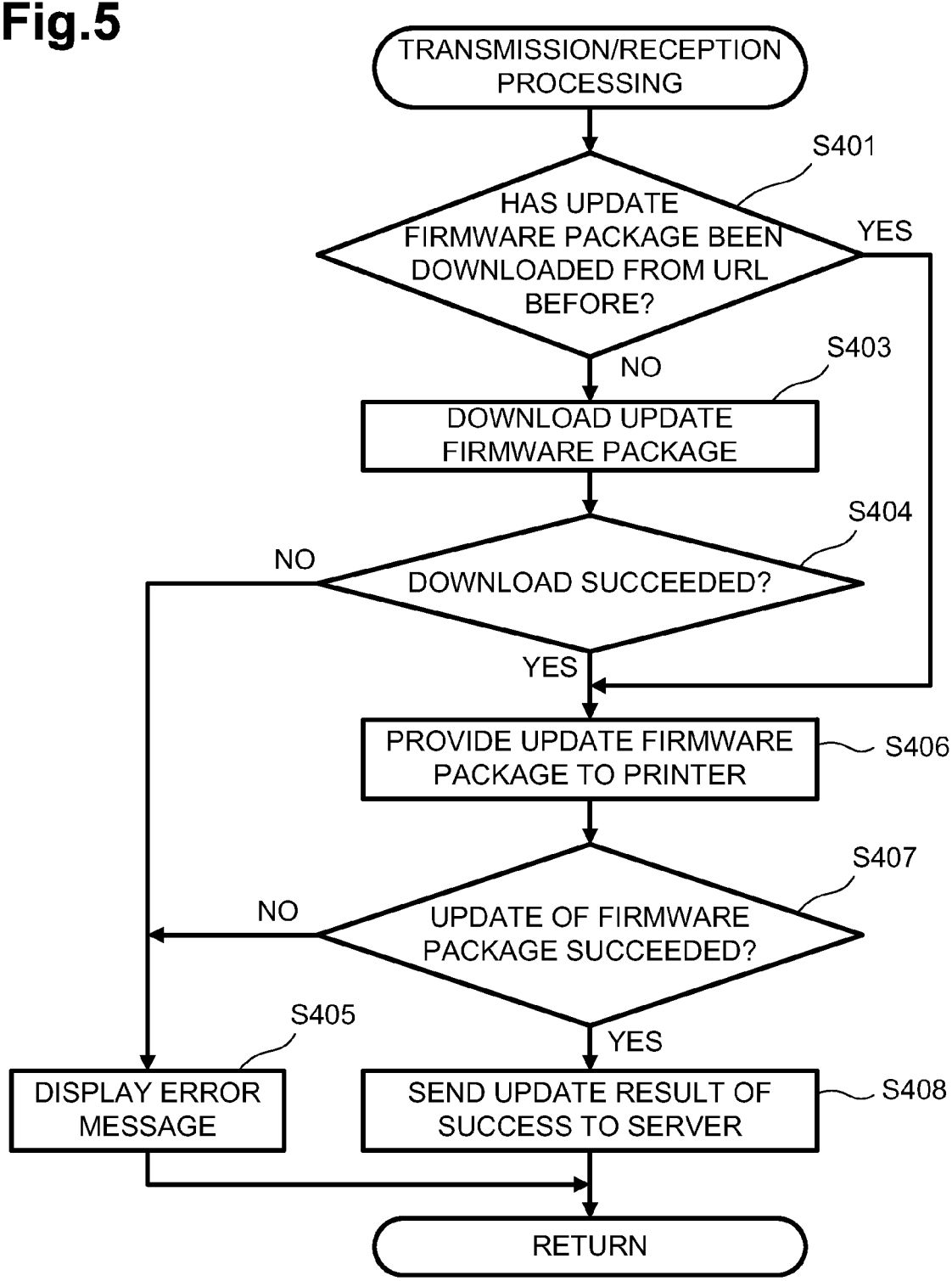

TERMINAL DEVICE FOR PROVIDING FIRMWARE PACKAGE BY BEING CONNECTABLE WITH PLURALITY OF ACCESSORY DEVICES AND A SERVER

CROSS REFERENCE TO RELATED APPLICATION

This application claims priority from Japanese Patent Application No. 2010-221251, filed on Sep. 30, 2010, the entire subject matter of which is incorporated herein by reference.

TECHNICAL FIELD

The invention relates to a technique for updating a firmware package installed on a device.

BACKGROUND

There has been known a technique for updating a firmware package installed on a device, e.g., a printer and a scanner. For example, a plurality of devices are connected with a single terminal device. In a conventional technique, the terminal device downloads updated firmware packages for the plurality of devices from a manufacturer's server and transmits the downloaded firmware packages to the plurality of devices to install them on the respective devices.

However, when the number of devices whose firmware packages are to be updated increases, an amount of data of firmware packages to be received by the terminal device may increase correspondingly. Therefore, a network load and a server load may become heavy.

SUMMARY

Embodiments provide for a technique for reducing the number of times a terminal device receives firmware packages to update firmware packages currently installed on a plurality of devices.

A terminal device configured to be connectable with a plurality of accessory devices and a server configured to store a firmware package, may include a processor, and a memory storing computer readable instructions that, when executed, cause the terminal device to perform functions. The functions may include a function of receiving the firmware package from the server, a function of storing the firmware package received from the server into the memory, a function of providing the stored firmware package to a first one of the plurality of accessory devices to install the firmware package therein, and a function of providing the stored firmware package to the other of the plurality of accessory devices to which the same firmware package is applied as the first one, to install the firmware package therein.

The invention can be accomplished in various embodiments, for example, a terminal device, an accessory device, a server, a system comprising a terminal device, an accessory device, and a server, a program for realizing those devices, functions or a method of the system, or a storage medium that stores the program.

According to one embodiment of the invention, the terminal device can provide the plurality of devices with the common firmware package, which has been obtained only once from the server and stored in the memory. Therefore, the number of receiving firmware packages can be minimized as compared with a case where a firmware package is received and provided individually to each device.

BRIEF DESCRIPTION OF THE DRAWINGS

Illustrative aspects will be described in detail with reference to the following figures in which like elements are labeled with like numbers and in which:

FIG. 4 is a flowchart of update processing in a second embodiment according to one or more aspects of the invention; and FIG. 5 is a flowchart of transmission/reception processing in the second embodiment according to one or more aspects of the invention.

DETAILED DESCRIPTION

Illustrative embodiments will be described in detail with reference to the accompanying drawings.

First, a first embodiment of the invention will be described with reference to FIGS. 1 to 3.

Figure 1:
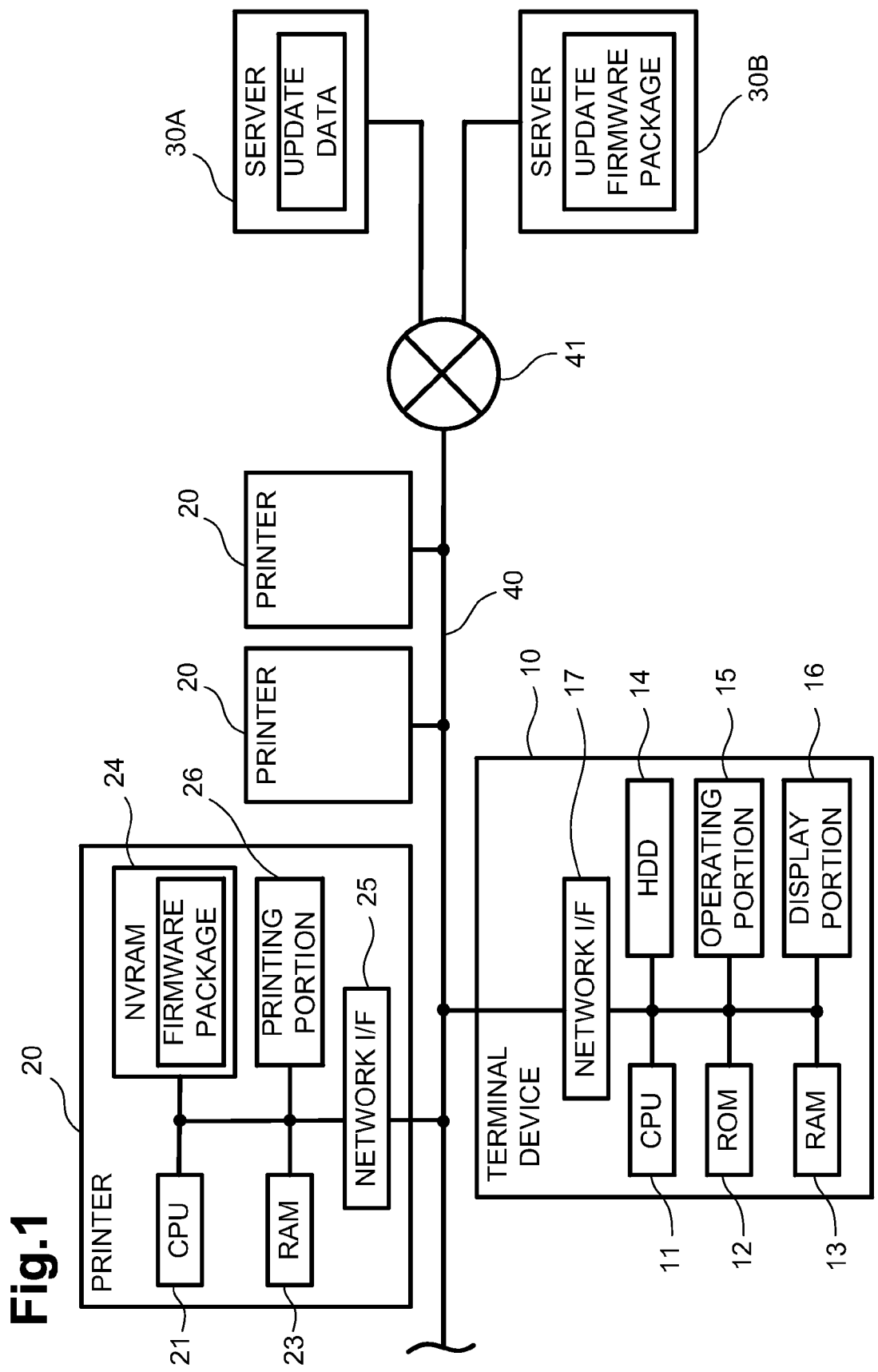
FIG. 1 is a block diagram showing a configuration of a system in an embodiment according to one or more aspects of the invention.

As shown in FIG. 1, a system comprises a terminal device 10, a plurality of printers 20, and a plurality of servers 30A, 30B.

The terminal device 10 is a general client computer, and comprises a central processing unit (CPU) 11, a read-only memory (ROM) 12, a random-access memory (RAM) 13, a hard disk drive (HDD) 14, an operating portion 15, a display portion 16, and a network interface (I/F) 17. The ROM 12, the RAM 13, HDD 14, a nonvolatile random-access memory (NVRAM), and an optical disk are examples of computer readable storage devices of the invention.

The ROM 12 is configured to store programs, e.g., a basic input output system (BIOS). A memory, for example, the HDD 14, is configured to store an operating system (OS) and a management application for managing a firmware package of each printer 20 (described later). A receiving section, a storing section, a providing section, an obtaining section, a determining section, a detecting section, and an erasing section, for example, the CPU 11, is configured to control each component of the terminal device 10 in accordance with the programs read from the ROM 12, the RAM 13, or the HDD 14.

A detecting portion, for example, the operation portion 15, comprises a keyboard and/or a pointing device. A user can input various instructions to the CPU 11 via the operating portion 15. The display portion 16 comprises a display configured to display various images thereon under control of the CPU 11. The network interface 17 is connected to a network, such as a local-area network (LAN) 40.

An accessory device, for example, each printer 20, comprises a central processing unit (CPU) 21, a random-access memory (RAM) 23, a nonvolatile random-access memory (NVRAM) 24, a network interface (I/F) 25, and a printing portion 26. The NVRAM 24 is configured to store a firmware package (a program). The CPU 21 executes the firmware package to accomplish control of each operation of the printer 20. A type and a version are assigned to the firmware package.

The firmware package currently installed on the printer 20 can be updated by which the firmware package is rewritten to an updated version.

In one embodiment, the network interface 25 is connected to the network such as the LAN 40. Therefore, communications between the terminal device 10 and a respective one of the printers 20 are available. The printing portion 26 is configured to form an image on a sheet based on print data provided by the terminal device 10, under control of the CPU 11.

Although three printers 20 are provided in this system shown in FIG. 1, two or four, or more printers 20 may be provided in this system. Various models of printers 20 may exist in this system. In this embodiment, the type of firmware package to be installed on each printer 20 depends on the model of the printer 20.

The LAN 40 can be connected to a wide area network (WAN) 41, such as the Internet, via a router (not shown). The servers 30A, 30B are connected to the WAN 41. The server 30A is configured to store update data, which includes, for example, updated version information of firmware packages and download URLs for update firmware packages on a model basis. The server 30A is also configured to provide necessary information to the terminal device 10 in response to a request made by the terminal device 10.

The server 30B is configured to store various types of update firmware packages, which are the newest versions, and to transmit the update firmware packages to the terminal device 10 in response to requests made by the terminal device 10.

Update processing to be executed to update firmware packages installed on the printers 20 will be described with reference to FIGS. 2 and 3. FIG. 2 shows a flowchart of the update processing, and FIG. 3 shows a flowchart of transmission/reception processing.

The update processing is executed as functions of the control application. Prior to the execution of the update processing, the management application is started on the terminal device 10 and an instruction to create a printer list is inputted by a user via the operating portion 15. Upon receipt of the instruction, the CPU 11 of the terminal device 10 broadcasts a detection signal of the printers 20 to the LAN 40 via the network interface 17. Then, based on the printers' responses to the broadcast, the CPU 11 creates a printer list, which is data showing the printers 20 located on the LAN 40 in list form, and displays the created printer list on the display portion 16.

Figure 2:
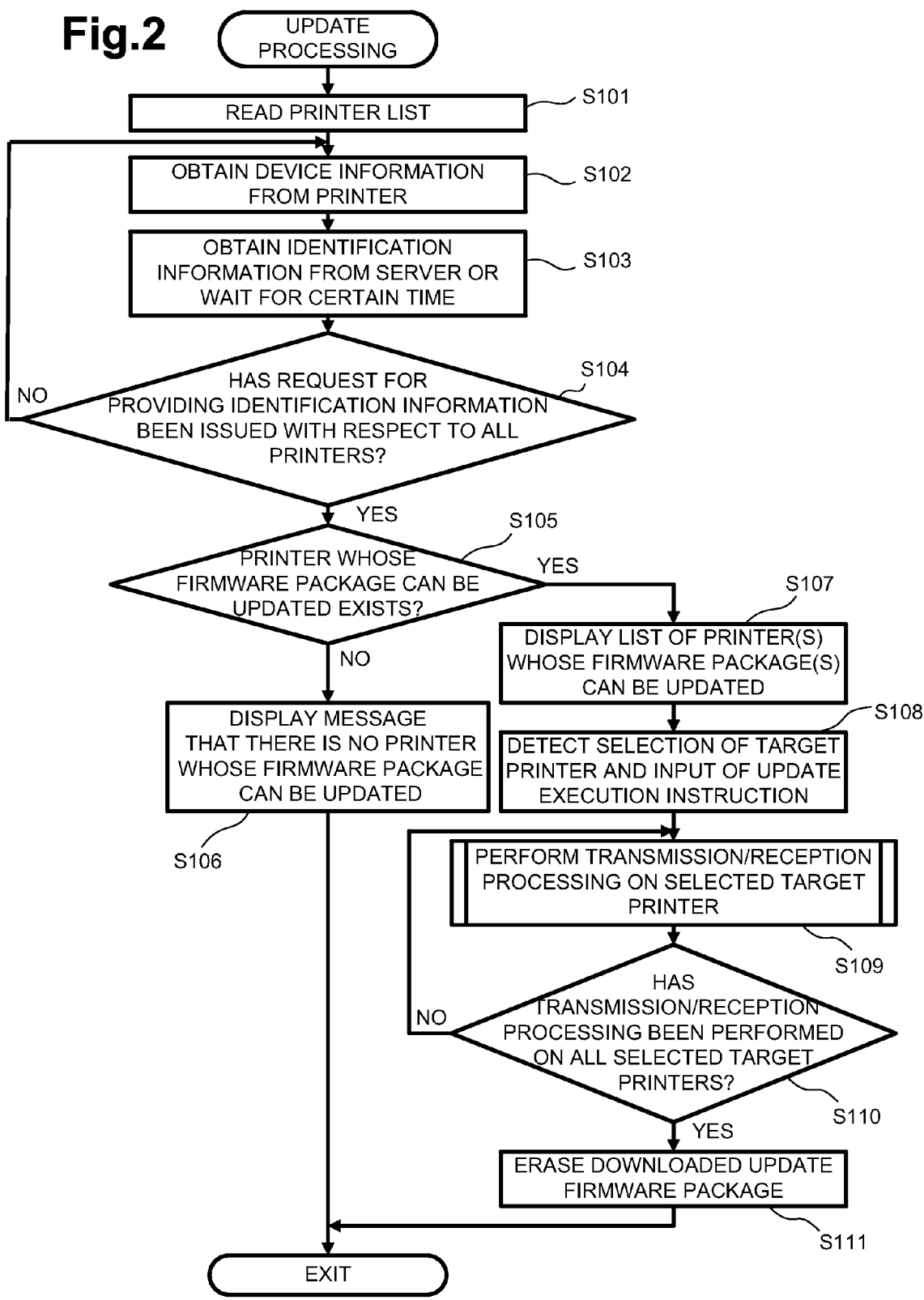
FIG. 2 is a flowchart of update processing according to a first embodiment according to one or more aspects of the invention.

After that, when an instruction to execute the update processing is inputted by the user via the operating portion 15, the CPU 11 starts the update processing shown in FIG. 2. First, the CPU 11 reads the printer list that was created prior to the update processing (step 101, hereinafter, S stands for a step).

The CPU 11 obtains, from one of the printers 20 included in the printer list, device information, via the network interface 17 (S102). The device information includes at least one of a type and version of firmware package currently installed on the printer 20, the model of the printer 20, and specifications of the printer 20. The type of firmware package to be installed on each printer 20 may be determined from the model or specifications of the printer 20.

Then, the CPU 11 sends a request to the server 30A for providing identification information, together with the obtained device information having the type and current version of the firmware package installed on the printer 20, via the network interface 17. After sending the request, the CPU 11 waits for a response from the server 30A. Upon receipt of the request, the server 30A obtains, with reference to the update data stored therein, an updated version appropriate for the firmware package type included in the device information provided together with the request, and compares the updated version and the current version of the firmware package to determine whether the version of the firmware package currently installed on the printer 20 is an earlier version than the updated version.

When the version of the firmware package currently installed in the printer 20 is an earlier version, the server 30A sends identification information that includes the firmware package type appropriate for the model (or the specifications) of the printer 20, a download URL for an update firmware package (a firmware package of an updated version), and the updated version information, back to the terminal device 10. Different download URLs are assigned according to the types of update firmware packages and a download URL is used as identification data having the type of firmware package.

When the firmware package currently installed on the printer 20 is the updated version, the server 30A does not send identification information back to the terminal device 10. As described above, the CPU 11 obtains the identification information appropriate for the model (or the specifications) of the printer 20 from the server 30A or waits for a certain time without obtaining the identification information (S103). When the firmware package currently installed on the printer 20 is the updated version, the server 30A may send, to the printer 20 or the terminal device 10, information indicating that an update of the firmware package is unnecessary.

The CPU 11 determines whether a request for providing identification information has been sent to the server 30A with respect to all of the printers 20 in the printer list (S104). When a request for providing identification information has not been issued with respect to all of the printers 20 in the printer list yet (S104:NO), the routine returns to S102. Then, the CPU 11 sends a request to another of the listed printers 20 whose identification information has not been requested to the server 30A yet, and obtains the device information of the printer 20. After that, the CPU 11 obtains identification information for the printer 20 from the server 30A or waits for a certain time. This routine is repeated until a request for providing identification information has been issued with respect to all of the printers 20 in the printer list.

When a request for providing identification information has been issued with respect to all of the printers 20 included in the printer list 20 (S104:YES), the CPU 11 determines whether the identification information, which includes the firmware package type, the updated version information and the download URL for the update firmware package, has been obtained for each of the printers 20 included in the printer list, i.e., there is a printer 20 whose firmware package needs to be updated (S105).

When there is no printer 20 whose firmware package needs to be updated (S105:NO), the CPU 11 displays, on the display portion 16, a message to the effect that there is no printer whose firmware package needs to be updated (S106) and exits the update processing.

When there are one or more printers 20 whose firmware packages need to be updated (S105:YES), the CPU 11 displays, on the display portion 16, the names of the printers 20 in list form (S107). The printers 20 whose firmware packages are to be updated (hereinafter, referred to as a target printer) are selected from the printers 20 listed on the display portion 16 and an instruction to perform an update of the firmware packages is inputted by the user via the operation portion 15. The CPU 11 detects the selection and the input performed by the user (S108).

When the instruction to perform the update of the firmware package(s) is inputted, the CPU 11 performs the transmission/reception processing on one of the target printers 20 selected in the printer list. In the transmission/reception processing, the CPU 11 receives an update firmware package appropriate for the target printer 20 from the server 30B and transmits the received update firmware package to the target printer 20.

Figure 3:
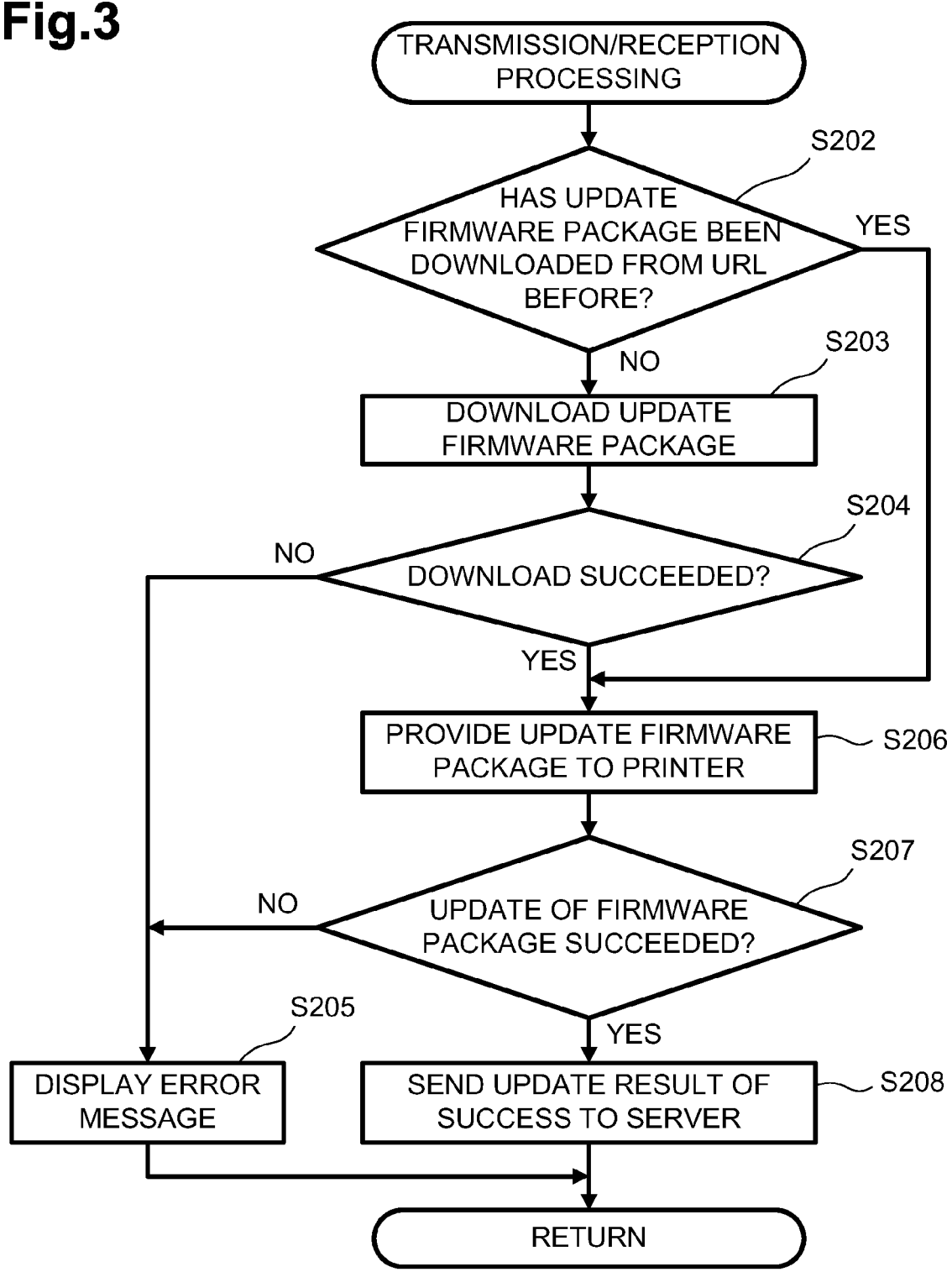
FIG. 3 is a flowchart of transmission/reception processing in the first embodiment according to one or more aspects of the invention.

In the transmission/reception processing shown in FIG. 3, the CPU 11 determines whether the update firmware package appropriate for the target printer 20, which was selected in the update processing, has already been downloaded from the download URL for the update firmware package (S202). When the update firmware package appropriate for the target printer 20 has not been downloaded from the download URL yet (S202:NO), the CPU 11 sends an update firmware package download request to the server 30B via the download URL. Then, the CPU 11 receives the update firmware package from the server 30B in response to the request, and stores the received update firmware package in the HDD 14 (S203).

Then, the CPU 11 determines whether the download of the update firmware package succeeded (S204). When the download failed due to some problems, e.g., a communication failure between the terminal device 10 and the server 30B (S204:NO), the CPU 11 displays an error message as download results in the printer list displayed on the display portion 16 (S205) and exits the transmission/reception processing.

When the download of the update firmware package succeeded (S204:YES), the CPU 11 provides (sends) the downloaded update firmware package to the target printer 20 (S206). Upon receipt of the update firmware package from the terminal device 10, the CPU 21 of the printer 20 performs installation processing, in which the current firmware package stored in the NVRAM 24 is overwritten and replaced with the update firmware package. When the installation processing succeeds, the CPU 21 of the printer 20 provides an update success notification to the terminal device 10. When the installation processing fails due to some problems, the CPU 21 of the printer 20 provides an update failure notification to the terminal device 10.

When the CPU 11 of the terminal device 10 determines that the update firmware package has already been downloaded from the download URL (S202:YES), the CPU 11 provides (sends) the update firmware package stored in the HDD 14 to the target printer 20 (S206).

That is, when there are target printers (similar devices) on which the same update firmware packages are to be installed, the CPU 11 reads, from the HDD 14, the update firmware package appropriate for the target printers 20 for common use (a common update firmware package) and transmits the read common update firmware package to the target printers 20, without downloading the same update firmware packages again and again from the server 30B. In other words, the CPU 11 provides the stored firmware package to a first one of the plurality of the printers 20 to install the firmware package therein, and provides the stored firmware package to the other of the plurality of the printers 20 to which the same firmware package is applied as the first one, to install the firmware package therein. Upon receipt of the update firmware package, the CPU 21 of the printer 20 performs the installation processing. An update firmware package for common use in a plurality of printers is referred to as a common update firmware package. A plurality of printers installed with a common update firmware package are referred to as similar devices.

When the CPU 11 received the update success notification from the target printer 20 after providing the update firmware package to the target printer 20 (S207:YES), the CPU 11 transmits the update result of success to the server 30A (S208) and exits the transmission/reception processing. In the server 30A, the update result is stored as management data. When the CPU 11 received the update failure notification from the target printer 20 (S207:NO), the routine goes to S205. In S205, the CPU 11 displays an error message to the effect that the update of the firmware package failed, in the list displayed on the display portion 16 and exits the transmission/reception processing.

When the transmission/reception processing for the target printer 20 is completed, the CPU 11 determines whether the transmission/reception processing has been performed on all of the target printers 20 selected in S108 of FIG. 2 (S110). When there is a target printer 20 on which the transmission/reception processing has not been performed yet (S110:NO), the routine returns to S109 and the CPU 11 performs the transmission/reception processing on the target printer 20 on which the transmission/reception processing has not been performed yet.

When the transmission/reception processing has been performed on all of the selected target printers 20 (S110:YES), the CPU 11 erases the update firmware package, which was downloaded in the transmission/reception processing, from the HDD 14 (S111) and exits the update processing. In other words, the CPU 11 erases the firmware package from the HDD 14 after the firmware package stored in the HDD 14 is provided to the plurality of the printers 20 to which the same firmware package is applied.

In the update processing, when there are printers 20 (similar devices) on which the same update firmware packages are to be installed, the CPU 11 provides the printers 20 with a common update firmware package, which has been obtained only once from the server 30B and stored in the HDD 14. Therefore, the number of receiving firmware packages can be minimized as compared with a case where a firmware package is received and provided individually to each of the printers 20. Accordingly, loads on the terminal device 10 and the servers 30A, 30B incident to the receipt of the firmware packages can be reduced.

In the update processing, the CPU 11 obtains device information that has at least one of the model and specifications of each printer 20 (S102) and obtains an appropriate download URL based on the device information (S103). Then, the CPU 11 determines that printers 20 provided with the same download URLs are similar devices on which a common update firmware package is to be installed (S202). Thus, unnecessary downloads of firmware packages can be prevented.

The determination is made as to whether the printers 20 are similar devices, based on the provided download URLs having the types of firmware packages. For example, although a common update firmware package is to be installed on different model printers 20, the terminal device 10 appropriately determines that those printers 20 are similar devices. Accordingly, unnecessary downloads of firmware packages can be prevented.

The CPU 11 can easily detect a plurality of printers 20 located on the LAN 40 by broadcasting a detection signal to the LAN 40.

After an update firmware package stored in the HDD 14 is commonly provided to all of the appropriate printers 20, the CPU 11 erases the update firmware package from the HDD 14 (S111). Accordingly, the update firmware package can be erased when it becomes unnecessary.

The CPU 11 can accept an instruction to perform an update inputted by the user via the operating portion 15 (S108) and can receive an update firmware package sent from the server 30B in response to the instruction.

A second embodiment of the invention will be described with reference to FIGS. 4 and 5. FIG. 4 shows a flowchart of update processing and FIG. 5 shows a flowchart of transmission/reception processing according to the second embodiment of the invention. The overall system has the same configuration as that according to the first embodiment and a description of that will be omitted.

Although the firmware package update of the printer 20 is performed based on the instruction inputted by the user in the first embodiment, the firmware package update is automatically performed without user's instruction in the second embodiment. In the second embodiment, the firmware package update is, for example, periodically, performed while the terminal device 10 is running.

Upon start of the update processing shown in FIG. 4, the CPU 11 of the terminal device 10 broadcasts a detection signal of the printers 20 to the LAN 40 via the network interface 17. Then, the CPU 11 creates a printer list based on the printers' responses to the broadcast (S301).

Then, the CPU 11 obtains, from one of the printers 20 included in the printer list, device information for identifying a type of firmware package to be installed in the printer 20 and information of a type and version of the firmware package currently installed on the printer 20 (S302). In other words, the CPU 11 obtains the device information of each of the plurality of the printers 20, the device information including at least one of a model, specifications, and current firmware package version and type. In the second embodiment, the same type of firmware packages will be installed on the same model printers.

Next, the CPU 11 determines whether identification information for the model that is the same as that already obtained by the printer 20 from the server 30A (S303). In other words, the CPU 11 determines whether the device information for each of the other of the plurality of the printers 20 is the same as the device information of the one of the plurality of printers 20. When the identification information for the same model has not been obtained yet (S303:NO), the CPU 11 obtains, from the server 30A, identification information including version information of the firmware package appropriate for the printer model and a download URL for the update firmware package (a updated version firmware package) (S304). When the identification information for the same model has already been obtained (S303:YES), the CPU 11 determines that the identification information for the printer 20 has already been obtained and does not obtain the identification information from the server 30A again. In other words, the CPU 11 obtains the identification information from the server 30A of the one of the plurality of the printers 20 based on the device information, the identification information including a type of firmware package appropriate for the one of the plurality of the printers 20, and obtains the identification information from the server 30A only for the others of the plurality of the printers 20 determined not to have the same device information as the one of the plurality of the printers 20.

In the first embodiment, the terminal device 10 obtains identification information or waits for a certain time in S103. The server 30A determines whether the firmware package currently installed in the printer 20 is the updated version and further determines whether to provide identification information in accordance with the result of the determination of the version. In the second embodiment, when the terminal device 10 sends a request to the server 30A for providing identification information, the server 30A provides identification information in response to the request without performing the determinations.

The CPU 11 determines whether identification information for all of the printers 20 included in the printer list have been obtained (S305). When the CPU 11 has not obtained identification information for all of the printers 20 (S305:NO), the routine returns to S302 and the CPU 11 obtains device information of another of the printers 20 whose identification information has not been obtained and then obtains identification information for the printer 20. This routine is repeated until the CPU 11 obtains identification information for all of the printers 20. As described above, in the processing of S302 to S305, identification information is obtained only once from the server 30A for the printers 20 having the same device information. Thus, unnecessary downloads are not performed.

When the CPU 11 has obtained identification information for all of the printers 20 (all models) (S305:YES), the CPU 11 determines whether there is a printer 20 whose firmware package needs to be updated by comparing the version information of the firmware package currently installed in the printer 20 and the version information included in the identification information for the printer 20 with respect to all of the printers 20 included in the printer list (S306).

When there is no printer 20 whose firmware package needs to be updated (S306:NO), the CPU 11 displays, on the display portion 16, a message to the effect that there is no printer whose firmware package needs to be updated (S307) and exits the update processing.

When there are one or more printers 20 whose firmware packages need to be updated (S306:YES), the CPU 11 selects all of the printers 20 whose firmware packages need to be updated, as target printers on which update firmware packages are to be installed, respectively (S308). Then, the CPU 11 performs the transmission/reception processing on one of the target printers 20 (S309).

In the transmission/reception processing shown in FIG. 5, the CPU 11 determines whether an update firmware package appropriate for the target printer 20, which was selected in the update processing, has already been downloaded from the download URL for the update firmware package (S401). When the update firmware package for the target printer 20 has not been downloaded from the download URL yet (S401:NO), the CPU 11 downloads the firmware package to HDD 14 from the server 30B by using the URL obtained in S304 of FIG. 4 (S403).

At that time, when the download failed (S404:NO), the CPU 11 displays an error message on the display portion 16 (S405). When the download succeeded (S404:YES), the CPU 11 provides the downloaded firmware package to the target printer 20 (S406).

When the CPU 11 determines that the update firmware package has already been downloaded from the download URL in S401 (S401:YES), the CPU 11 reads the firmware package appropriate for the target printer 20 from the HDD 14 and transmits the read firmware package to the target printer 20. That is, the CPU 11 does not obtain the same download URL from the server 30A again when the target printer 20 is the same model as the printer 20 for which the download URL has already been obtained. In addition, the CPU 11 does not download the same update firmware package from the server 30B again.

When the printer 20 is provided with the update firmware package from the terminal device 10, the printer 20 performs the installation processing and sends an update success notification or an update failure notification back to the terminal device 10 based on the update result. When the CPU 11 of the terminal device 11 receives the update success notification from the target printer 20 (S407:YES), the CPU 11 sends the update result of success to the server 30A (S408) and exits the transmission/reception processing. When the CPU 11 receives the update failure notification from the target printer 20 (S407:NO), the routine goes to S405. In S405, the CPU 11 displays an error message to the effect that the update of the firmware package failed in the list displayed on the display portion 16 and exits the transmission/reception processing.

After the CPU 11 exits the transmission/reception processing in S309 of FIG. 4, the CPU 11 determines whether the transmission/reception processing has been performed on all of the target printers 20 selected in S308 of FIG. 3 (S310). When there is a target printer 20 on which the transmission/reception processing has not been performed yet (S310:NO), the routine goes back to S309 and the CPU 11 performs the transmission/reception processing on the target printer 20 on which the transmission/reception processing has not been performed yet.

When the transmission/reception processing has been performed on all of the selected target printers 20 (S310:YES), the CPU 11 erases the update firmware package, which was downloaded in the transmission/reception processing, from the HDD 14 (S311) and exits the update processing.

According to the second embodiment of the invention, the CPU 11 obtains the device information of each printer 20 (S302) and determines that the printers 20 that have the same device information are referred to as similar devices (S303). Then, the CPU 11 provides the printers 20 (the similar devices) with a common firmware package, which was obtained only once from the server 30B and stored in the HDD 14 (S406). Therefore, the number of receiving firmware packages can be reduced as compared with a case where a firmware package is received and provided individually to each of the printers 20. Accordingly, loads on the terminal device 10 and the servers 30A, 30B incident to the receipt of the firmware packages can be reduced. In addition, the terminal device 10 can easily determine that the printers 20 having the same device information are similar devices.

The CPU 11 obtains a single download URL for the printers 20 having the same device information (S304). This prevents the terminal device 10 from obtaining a download URL of the same firmware package twice. Accordingly, loads on the terminal device 10, the network, and the server 30A incident to the receipt of identification information can be reduced.

While the invention has been described in detail with reference to the specific embodiments thereof, it would be apparent to those skilled in the art that various changes, arrangements and modifications may be applied therein without departing from the spirit and scope of the invention.

In the above-described embodiments, the update of the firmware packages of the printers are described as an example. However, the invention is not limited to the specific embodiments thereof, and the invention may be applied to techniques for updating firmware packages of image processing devices, e.g., copying machines, scanning devices, facsimile machines, and digital cameras, or devices other than the image processing devices.

In the above-described embodiments, which type of firmware package is to be installed on each printer 20 depends on the printer model. According to the invention, the type of firmware package may be specified based on printer specifications or both of the printer model and specifications. For example, although printers are the same model, different types of firmware packages may be installed on the printers based on country-basis specifications or the presence or absence of an optional function, e.g., a scanning function.

The invention may be applied to a single device on which a plurality of firmware packages are installed. For example, four firmware packages A, B, C, D are installed on a device. The CPU 11 of the terminal device 10 determines whether each of the firmware packages A, B, C, D needs to be updated. When the firmware packages B, C, D need to be updated, the CPU 11 obtains update firmware packages B', C', D' corresponding to the firmware packages B, C, D and provides the update firmware packages B', C', D' to the device.

At that time, the CPU 11 determines whether the update firmware packages B', C', D' have already been downloaded from the server 30B. As to the update firmware package that has not been downloaded yet, e.g., the update firmware package B', the CPU 11 downloads and provides it from the server 30B to the device. As to the update firmware packages that have already been downloaded before, e.g., the update firmware packages C' and D', the CPU 11 reads and provides them from the HDD 14 to the device without downloading the same update firmware packages twice.

In the above-described embodiments, a download URL for firmware package is used as identification data indicating a type of firmware package. For example, a file name of firmware package may be used as identification information.

In the above-described embodiments, device information is used as device information for identifying a type of firmware package to be installed in a device. According to the invention, serial numbers or specification codes of a device, or identification data of firmware package installed in the device may be used as device information.

In the above-described embodiments, a download URL corresponds to a type of firmware package. However, they do not need to correspond to each other. In this case, for example, a query is sent to a URL of a server with a parameter indicating identification data of firmware package to make the server provide an appropriate firmware package.

Update firmware packages may be distributed and stored in several servers, or may be stored in a server that stores update data.

In the above-described embodiments, the downloaded update firmware package is erased from the HDD 14 in the last step of each update processing. However, the downloaded update firmware package may be maintained in the HDD 14 after the update processing is finished. In this case, when there is a device whose firmware package needs to be updated by using the stored update firmware package, the stored update firmware package may be provided to the device without the same update firmware package downloaded again from the server, in another update processing. Only updated version firmware packages may be maintained in the HDD 14 and the previous version firmware packages may be erased from the HDD 14.

According to the invention, an entry screen for management password may be displayed on the display portion 16 when a firmware package of a device is updated. A firmware package update may be allowed by a user's input of a predetermined password via the operating portion 15.

In the above-described embodiments, the terminal device and the printers are connected with each other via the LAN. According to the invention, a terminal device and a plurality of devices may be connected with each other via other ways, for example, a Universal Serial Bus (USB).

In the first embodiment, the server 30A determines whether the firmware package currently installed in a printer 20 is an earlier version than the updated version. In the second embodiment, the terminal device 10 performs the same determination by using the identification information sent from the server 30A. However, the determination may be made by other ways in the first and the second embodiments.

More specifically, in the first embodiment, the processing of S103 and S104 of FIG. 2 may be replaced with the processing of S304 and S305 of FIG. 4. In this case, when the terminal device 10 sends a request for providing identification information to the server 30A, the server 30A sends back the identification information in response to the request without performing the determination on the request. In the second embodiment, the processing of S304 and S305 of FIG. 4 may be replaced with the processing of S103 and S104. In this case, the server 30A determines whether to send identification information to the terminal device 10 in response to a request for providing identification information and the terminal device 10 obtains the identification information from the server 30A or waits for a certain time.

In the above-described embodiments, a receiving section, a storing section, a providing section, an obtaining section, a determining section, a detecting section, and an erasing section are implemented by the single CPU. According to the invention, those sections may be implemented by different CPUs, respectively, or an application-specific integrated circuit (ASIC) or other circuits.

In another embodiment, the CPU 11 sends a request for providing identification information to the server 30A via the network interface 17. This request has the obtained device information having the model of the printer 20. After sending the request, the CPU 11 waits for a response from the server 30A.

Upon receipt of the request, the server 30A uses the received printer model to determine the appropriate firmware package, including firmware type and version. The server 30A sends a download URL of the determined firmware package to the CPU 11 that downloads the firmware package using the URL. The CPU 11 then distributes the firmware package to the printer 20 and any other printer having the same model as the printer 20 for which identification information had been requested.

What is claimed is:

1. A computer-readable storage device which is not a signal storing a computer-executable program executable by a processor of a terminal device which is connectable with a plurality of accessory devices including a first accessory device and a second accessory device and a server storing a first firmware package and a second firmware package, the program which when executed causes the processor to execute functions comprising:
obtaining, from the first accessory device, first device information of the first accessory device, the first device information comprising at least one of a model of the first accessory device, specifications of the first accessory device, and current firmware package type for the first accessory device;
obtaining, from the server, a first URL based on the obtained first device information in response to obtaining the first device information;
obtaining, from the second accessory device, second device information of the second accessory device, the second device information comprising at least one of a model of the second accessory device, specifications of the second accessory device, and current firmware package type for the second accessory device;
determining, whether the obtained first device information and the obtained second device information are the same;
obtaining, from the server, when it is determined that the obtained first device information and the obtained second device information are not the same, a second URL based on the second device information, otherwise, when it is determined that the obtained first device information and the obtained second device information are the same, not obtaining the second URL;
receiving, from the server, the first firmware package using the obtained first URL;
storing the received first firmware package from the server in a memory of the terminal device, in response to receiving the first firmware package;
providing the stored first firmware package to the first accessory device to install the first firmware package therein;
determining if the obtained first URL and the obtained second URL are the same;
providing the stored first firmware package to the second accessory device without receiving the second firmware package from the server in response to satisfying at least one of the following: (i) it is determined that the obtained first URL and the obtained second URL are the same and (ii) the obtained first device information and the obtained second device information are determined to be the same and the second URL is not obtained; and
receiving, from the server, the second firmware package using the obtained second URL, in response to satisfying both (I) it is determined that the obtained first URL and the obtained second URL are not the same; and (II) the obtained first device information and the obtained second device information are determined not to be the same.

2. The computer-readable storage device according to claim 1, wherein the terminal device is configured to be connectable with the plurality of accessory devices via a network, and
the functions further comprise detecting the plurality of accessory devices connected to the network by broadcasting a detection signal to the network.

3. The computer-readable storage device according to claim 1, wherein the functions further comprise erasing, from the memory of the terminal device, the stored first firmware package when the first firmware package is provided to the first accessory device and the second accessory device.

4. The computer-readable storage device according to claim 1, wherein the functions further comprise detecting a user's input of an instruction to allow the server to transmit the first firmware package, and
the first firmware package is received from the server in accordance with the detection of the instruction.

5. The computer-readable storage device according to claim 1, wherein the terminal device is configured to be connected with the server via an Internet, and
the first firmware package is received from the server via the Internet.

6. The computer-readable storage device according to claim 1, wherein the functions further comprise:
displaying, in response to obtaining the first URL, a plurality of names including a name of the first accessory device and a name of the second accessory device; and
accepting, in response to displaying the plurality of names, a user instruction to provide the first firmware package to the first accessory device and the second accessory device.

7. The computer-readable storage device according to claim 1, wherein the first device information further comprises a current version of a firmware package stored in the first accessory device, and
the first URL is obtained when the obtained current version and an update version of the first firmware package stored in the server are different.

8. A terminal device which is connectable with a plurality of accessory devices including a first accessory device and a second accessory device and a server storing a first firmware package and a second firmware package, the terminal device comprising:
a storage device; and
a processor comprising hardware configured to:
obtain, from the first accessory device, first device information of the first accessory device, the first device information comprising at least one of a model of the first accessory device, specifications of the first accessory device, and current firmware package type for the first accessory device,
obtain, from the server, a first URL based on the obtained first device information,
obtain, from the second accessory device, second device information of the second accessory device, the second device information comprising at least one of a model of the second accessory device, specifications of the second accessory device, and current firmware package type for the second accessory device,
determine, whether the obtained first device information and the obtained second device information are the same,
obtain, from the server, when the processor determines that the obtained first device information and the obtained second device information are not the same, a second URL based on the second device information, otherwise, when it is determined that the obtained first device information and the obtained second device information are the same, the second URL is not obtained,
receive, from the server, the first firmware package using the obtained first URL,
store the received first firmware package from the server in the storage device,
provide the stored first firmware package to the first accessory device to install the first firmware package therein,
determine if the obtained first URL and the obtained second URL are the same,
provide the stored first firmware package to the second accessory device without receiving the second firmware package from the server in response to satisfying at least one of the following: (i) it is determined that the obtained first URL and the obtained second URL are the same and (ii) the obtained first device information and the obtained second device information are determined to be the same and the second URL is not obtained, and
receive, from the server, the second firmware package using the obtained second URL, in response to satisfying both (I) it is determined that the obtained first URL and the obtained second URL are not the same; and (II) the obtained first device information and the obtained second device information are determined not to be the same.

9. The terminal device according to claim 8, wherein the terminal device is configured to be connectable with the plurality of accessory devices via a network and wherein, the processor comprising hardware is further configured to broadcast a detection signal to the network to detect the plurality of accessory devices.

10. The terminal device according to claim 8, the processor comprising hardware is further configured to erase, from the storage device, the stored first firmware package when the first firmware package is provided to the first accessory device and the second accessory device.

11. The terminal device according to claim 8, the processor comprising hardware is further configured to detect a user's input of an instruction to allow the server to transmit the first firmware package, and wherein the first firmware package is received from the server in accordance with the detection of the instruction.

12. The terminal device according to claim 8, wherein the terminal device is configured to be connected with the server via an Internet, and wherein the first firmware package is received from the server via the Internet.

13. The terminal device according to claim 8, further comprising a display, wherein the processor comprising hardware is further configured to:
display on the display, in response to obtaining the first URL, a plurality of names including a name of the first accessory device and a name of the second accessory device, and
accept, in response to displaying the plurality of names, a user instruction to provide the first firmware package to the first accessory device and the second accessory device.

14. The terminal device according to claim 8, wherein the first device information further comprises a current version of a firmware package stored in the first accessory device, and wherein the processor comprising hardware is further configured to obtain the first URL when the obtained current version and an update version of the first firmware package stored in the server are different.

15. A method comprising:
obtaining, from a first accessory device, first device information of the first accessory device, the first device information comprising at least one of a model of the first accessory device, specifications of the first accessory device, and current firmware package type for the first accessory device;
obtaining, from a server, a first URL based on the obtained first device information;
obtaining, from a second accessory device, second device information of the second accessory device, the second device information comprising at least one of a model of the second accessory device, specifications of the second accessory device, and current firmware package type for the second accessory device;
determining, whether the obtained first device information and the obtained second device information are the same;
obtaining, from the server, when it is determined that the obtained first device information and the obtained second device information are not the same, a second URL based on the second device information, otherwise, when it is determined that the obtained first device information and the obtained second device information are the same, not obtaining the second URL;
receiving, from the server, a first firmware package using the obtained first URL;
storing the received first firmware package from the server;
providing the stored first firmware package to the first accessory device to install the first firmware package therein;

determining if the obtained first URL and the obtained second URL are the same;
providing the stored first firmware package to the second accessory device without receiving the second firmware package from the server in response to satisfying at least one of the following: (i) it is determined that the obtained first URL and the obtained second URL are the same and (ii) the obtained first device information and the obtained second device information are determined to be the same and the second URL is not obtained; and
receiving, from the server, the second firmware package using the obtained second URL, in response to satisfying both (I) it is determined that the obtained first URL and the obtained second URL are not the same; and (II) the obtained first device information and the obtained second device information are determined not to be the same, wherein the server stores the first firmware package and the second firmware package.

16. The method of claim 15, further comprising:
broadcasting a detection signal to a network to detect a plurality of accessory devices including the first accessory device and the second accessory device to detect accessory devices connected to the network.

17. The method of claim 15, further comprising:
erasing the stored first firmware package when the first firmware package is provided to the first accessory device and the second accessory device.

18. The method of claim 15, further comprising:
detecting a user's input of an instruction to allow the server to transmit the first firmware package, and wherein the first firmware package is received from the server in accordance with the detection of the instruction.

19. The method of claim 15, further comprising:
displaying, in response to obtaining the first URL, a plurality of names including a name of the first accessory device and a name of the second accessory device; and
accepting, in response to displaying the plurality of names, a user instruction to provide the first firmware package to the first accessory device and the second accessory device.

20. The method of claim 15, wherein the first device information further comprises a current version of a firmware package stored in the first accessory device, and
the first URL is obtained when the obtained current version and an update version of the first firmware package stored in the server are different.

* * * * *